United States Patent [19]

Yajima

[11] 4,380,387
[45] Apr. 19, 1983

[54] COMPOSITE INFORMATION RECORDING APPARATUS

[75] Inventor: Tatsuo Yajima, Hino, Japan

[73] Assignee: Konishiroku Photo Industry Co., Ltd., Tokyo, Japan

[21] Appl. No.: 312,709

[22] Filed: Oct. 19, 1981

Related U.S. Application Data

[63] Continuation-in-part of Ser. No. 50,616, Jun. 21, 1979, abandoned.

[30] Foreign Application Priority Data

Jun. 26, 1978 [JP] Japan .................................. 53-77258

[51] Int. Cl.³ .......................................... G03G 15/00
[52] U.S. Cl. ................................. 355/3 R; 346/153.1; 355/14 R
[58] Field of Search ................... 355/3 R, 7, 14 R; 346/153.1, 155

[56] References Cited

U.S. PATENT DOCUMENTS

| | | | |
|---|---|---|---|
| 3,358,081 | 12/1967 | Young et al. | 355/3 R X |
| 4,012,776 | 3/1977 | Mrdjen | 355/4 X |
| 4,046,471 | 9/1977 | Branham et al. | 355/3 R X |
| 4,166,691 | 9/1979 | Ebi et al. | 355/3 DD X |

*Primary Examiner*—Fred L. Braun
*Attorney, Agent, or Firm*—Jordan B. Bierman; Linda Bierman

[57] ABSTRACT

A composite information recording apparatus is proposed in which in addition to known equipment for improving the image from a copy board onto a light sensitive medium such as a drum through an optical system, and reproducing copies of said image from the drum, a secondary optical system is provided which may intercept the path of the known optical system and direct the image to a photoelectric converter; the image on the photoelectric converter may be processed for external transmission, for storing in a memory or for activation of a second recording apparatus such as an optical fiber tube for recording information on the drum. The optical fiber tube may also be actuated from external message sources.

4 Claims, 2 Drawing Figures

COMPOSITE INFORMATION RECORDING APPARATUS

This application is a continuation-in-part of application Ser. No. 50,616 filed June 21, 1979 now abandoned, having a Japanese priority date of June 26, 1978.

BACKGROUND OF THE INVENTION

The present invention relates to a composite information recording apparatus comprising an optical system for projecting an image of an original supported on a copy board onto a light sensitive medium, reproducing means for producing an electrostatic latent image on said light sensitive medium by scanning with an electric information signal, and means for producing a visible recording by developing the electrostatic latent image on the light sensitive medium.

In the present specification, the term "reproducing means" is intended to mean an electrical quantity-to-light quantity converter device adapted to be supplied at the input thereof with off-line or on-line internal or external signals, thereby to reproduce the signals on the light sensitive medium through scanning. For example, the reproducing means may be an optical fiber tube (OFT), a thin window recording tube (TWT), a laser scanner or the like.

DESCRIPTION OF THE PRIOR ART

In general, in the field of the image information processing, various copying machines are used for obtaining a recording of the same contents as those of an original, while various facsimile printers are adapted for transmitting the contents of an original to a remote place at which the contents are to be recorded. Recently, with a view to reducing space requirements as well as expenditure involved by providing individually the single-purpose machines in aggregation, a so-called composite information recording apparatus for multi-purpose is being developed starting from the recognition that a series of recording processes after the formation of the electrostatic latent image are common among various apparatus such as the copying apparatus and the facsimile receiver apparatus. For example, in the specification of Japanese Laid-Open patent application No. 63340/1977 titled "Image Reproducing and Image Forming Composite Apparatus", there is disclosed such type of apparatus which includes an optical system for projecting an image of an original carried by a copy board onto a light sensitive member and an optical fiber tube for reproducing video signals supplied from external systems on the light sensitive medium. Thus, the apparatus is capable of operating as a copying apparatus and an optical printer more economically than a mere combination of separately provided copying machine and optical printer. However, the advantage of the apparatus of the above patent application only resides in the multipurpose usability.

Further, Japanese Laid-Open patent application No. 87587/1977 teaches a composite information recording apparatus which is similar to the apparatus described above in respect of the provision of the optical system and the reproducing optical fiber tube, but different in that means for transmitting the information of an original now being copied to an external system (e.g. electronic computer) is additionally provided in combination with means for reproducing the information read out from a storage of the external computer in exchange of the output signal through the optical fiber tube. Accordingly, the apparatus proposed in Japanese Laid-Open patent application No. 87587/1977 is advantageous in that the format, address, remarks or the like allotted to the original image to be copied can be recorded in a form of superposed composite information. However, this apparatus suffers from the drawback that the optical fiber tube is difficult to position with the required accuracy relative to the light sensitive medium, thereby resulting in degradation in the available resolving power of the optical fiber tube. Furthermore, improved structure of the optical fiber tube is required, because the scanning bright lines thereof are utilized as a reading light source. Additionally, Japanese Laid-Open patent application No. 114340/1977 discloses a light scanning apparatus which is capable of producing a composite record in an allotted format and is superposed on a video information input from an external apparatus. More specifically, this optical scanner is developed as a peripheral device for an electronic computer system and includes means for converting the scanning position of a recording laser beam into a corresponding position on a recording sheet, and means for reading and recording light reflection information from the recording sheet having an allotted or specified format. Accordingly, the above optical scanning apparatus is certainly very convenient for producing a composite record containing information supplied from the computer and imparted with a predetermined format and/or address. However, difficulty is encountered in the simple copying operation of the conventional type, as well as reproduction of a composite record containing copied image information superposed with a specific form, address or the like. Such difficulty arises particularly in the case of the recording on a record sheet of a great length because of the necessity for feeding a standard format in precedence to the recording sheet.

SUMMARY OF THE INVENTION

In the light of the technical state described above, an object of the present invention is to provide a composite information recording apparatus comprising an optical system for projecting an image of an original supported on a copy board onto a light sensitive medium, reproducing means for producing an electrostatic latent image formed on the light sensitive medium by scanning with an electric information signal and means for producing a visible recording by developing the electrostatic latent image on the light sensitive medium, characterized by a second optical system branched from the optical system by an optical path switching mirror, and a photoelectrical converter element located at the imaging position of the second optical system and having an output terminal connected to either one of the reproducing means or to an external apparatus through an interface unit.

The novel features and advantages of the invention will become more apparent from detailed description of the preferred embodiment thereof taken in conjunction with the accompanying drawings.

DETAILED DESCRIPTION OF THE PREFERRED EMBODIMENT

Figure 1:
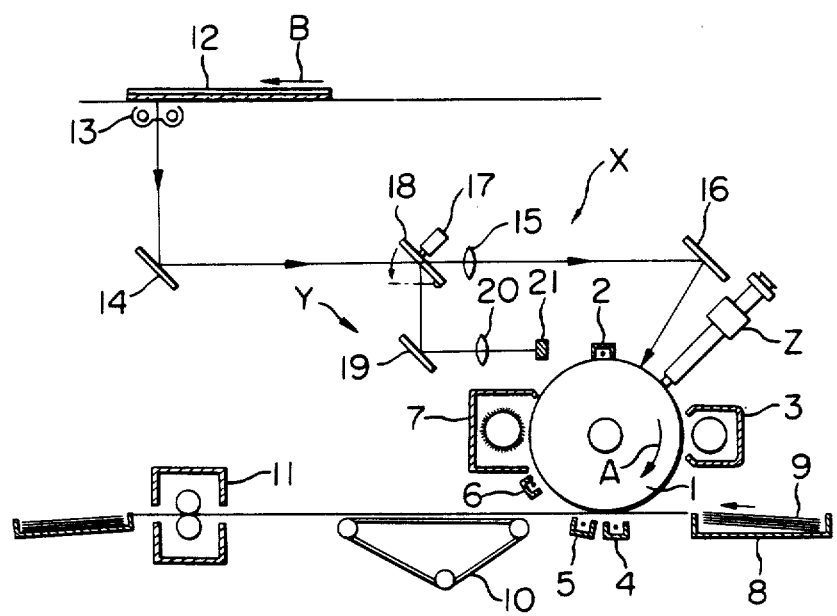
FIG. 1 shows schematically a general arrangement of a composite information recording apparatus according to an embodiment of the invention.

Referring now to FIG. 1, reference numeral 1 denotes a rotatable drum having a light sensitive surface formed of Se, ZnO or the like and adapted to be rotated in the direction indicated by an arrow A. There are disposed around the drum 1 a charging device 2 including corona charging electrodes, a developing device 3 such as a magnetic brush developing device, a transfer electrode 4, a separating electrode 5, a charge removing device 6 similar to the charging device and a cleaning device 7 successively in this order as viewed in the rotating direction of the drum 1. As well known in an electrophotographic copying machine, recording sheet 9 supplied from a magazine 8 is moved between the light sensitive drum 1 and the transfer electrode 4, whereupon a toner image developed on the peripheral surface of the drum 1 is transferred to the recording paper 9, which is then discharged into the sheet receiving means through a transporting mechanism 10 and an image fixing device 11.

Disposed at an upper portion of the copying machine is a copy board 12 which is adapted to be moved in the direction indicated by an arrow B and illuminated by a light source 13 located immediately below the copy board 12 in accordance with the copying operation.

Further, disposed between the copy board 12 and the drum 1 is an optical system X including a first mirror 14, a lens 15 and a second mirror 16. In the case of the illustrated embodiment, the distance a between the original and the lens 15 as well as the distance b between the lens 15 and the light sensitive peripheral surface of the drum 1 are so selected that the conditions $f_1 = a/2$ and $a = b$ are satisfied, where $f_1$ represents focal distance of the lens 15. Accordingly, the image of an original to be copied is focused onto the peripheral surface of the drum 1 at a location between the charging device 2 and the developing device 3 with a magnification factor of 1/1.

Disposed in the optical path between the mirror 14 and the lens 15 is a swingable mirror 18 which serves as an optical path switching element under the control of a solenoid 17 adapted to be energized as the occasion requires. In the reflecting optical path of the swingable mirror 18 (sometimes it is called an optical path switching mirror) which may also be constituted by a half mirror, there is disposed another optical system Y including a third mirror 19 and a second lens 20 which serves to project the original image of a contracted size onto a photoelectrical converter element 21. The focal length $f_2$ of the second lens 20 is so selected that the following expression validly applies:

$$f_2 = \frac{C}{1+m}, \text{ and } d = \frac{C}{m}$$

where 1/m represents an image contracting ratio, C represents a distance between the original and the second lens 20, and d represents a distance between the second lens 20 and the photoelectrical converter element 21. More specifically, in the case of the illustrated embodiment, it is so dimensioned that C=400 mm, 1/m=1/7 and hence $f_2$=50 mm and d≈57 mm. The photoelectrical converter element 21 may be constituted by any one of commercially available devices so far as a number of picture element signals derived by decomposing the original image into a corresponding number of picture elements can be converted into corresponding electric quantities. For example, a charge-coupled device (hereinafter referred to as CCD in abridgement) or photodiode array may be employed.

The composite information recording apparatus according to the invention is provided with an optical fiber tube (OFT) which constitutes a major part of the reproducing system Z and has a recording end face directed toward the peripheral surface of the drum 1 at a position between the charging device Z and the developing device 3. The input terminal of the optical fiber tube (OFT) may be supplied with information read out from a memory unit of a computer or facsimile input signal as in the case of the hitherto known recording system. However, according to the teaching of the invention, the signal derived by processing the output signal from the photoelectrical converter element 21 may also be applied to the input terminal of the optical fiber tube, all in a manner hereinafter described. The recording end face of the optical fiber tube (OFT) may be positioned either in physical contact with the peripheral surface of the drum 1 or with a small gap from the latter. However, in the latter case, possible degradation in the resolving power should be compensated by correspondingly increasing the quantity of exposure light.

In the regular copying mode, solenoid 17 is deenergized permitting optical system X to operate in the usual manner to place an image on drum 1 for reproduction on recording paper 9. Optical system Y will be inoperative and the circuitry for energization of the reproducing system Z as illustrated in FIG. 2 will be caused to be inoperative.

Figure 2:
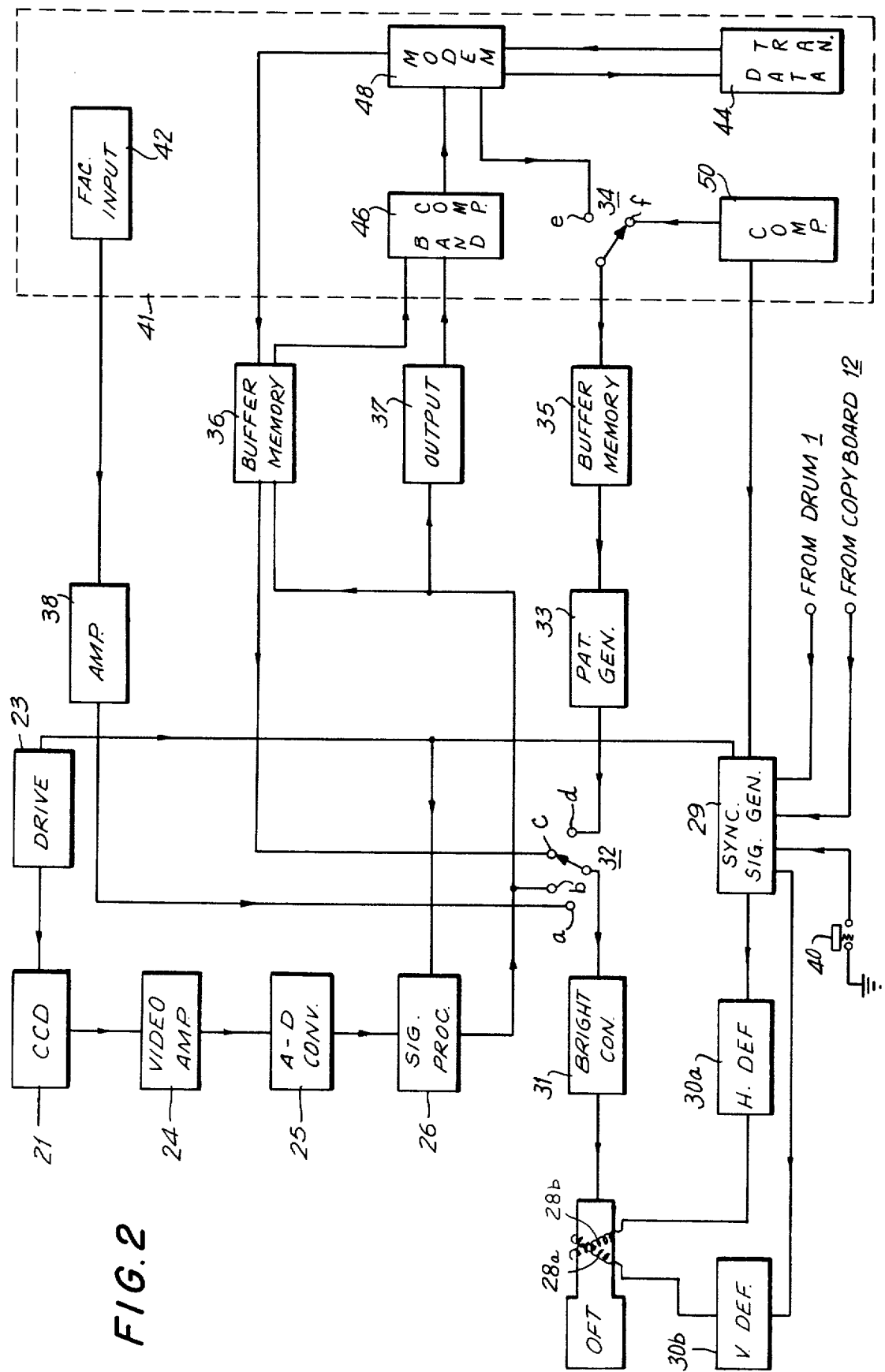
FIG. 2 is a block circuit diagram illustrating the manner in which the various apparatuses of FIG. 1 are electrically interconnected and the manner in which certain of the apparatuses are energized from external sources.

The circuitry illustrated in FIG. 2 shows the options available in accord with the present invention and more particularly the different ways of adding information to drum 1 through means such as the optical fiber tube of reproducing system Z. The OFT of such a system is provided with the usual horizontal and vertical deflecting coils 28a and 28b respectively controlled by horizontal and vertical deflecting circuits 30a and 30b under the control of a synchronizing signal generator 29. As hereinafter described, input to the OFT is derived from switch 32 through brightness control circuit 31. Switch 32, in turn, is connected to a choice of inputs as described hereinafter, including a choice of external signal sources separately grouped and indicated at 41.

It will be noted that the synchronizing signal generator 29 not only controls deflecting circuits 30a and 30b of the OFT, but also the drive circuit 23 for the photoelectrical converter element 21 and signal processor 26. Generator 29, in turn, can be started into operation by depression of the copy button 40. It is also under the control of a timing signal indicating the beginning and completion of the copying operation from the copy board 12 through conventional means (not shown) of a starting signal from drum 1, and of an output signal from computer 50 as hereinafter explained.

As hereinbefore stated, one of the objects of the present invention is to provide composite information apparatus which permits the recording and reproduction of facsimile signals. If switch 32 is connected to contact a, facsimile digital input 42 will be connected to the input of OFT through buffer amplifier 38. Such facsimile signals will thus appear on drum 1 and then be reproduced on sheets 9. For this purpose, neither of the optical systems is activated.

In what might be termed a composite information recording mode, when solenoid 17 is energized, optical system X becomes inoperative and optical system Y operative, thus transmitting the indicia on copy board 12 to converter element 21; the output of this element after passing through video amplifier 24 undergoes analog to digital conversion in A-D converter 25 which comprises a comparator dependent upon the amplitude of the analog video signal input. The output of the converter is fed to a suitable signal processor 26. The CCD operates under the control of driver circuit 23, and the latter as well as the signal processor are controlled by synchronizing signals from synchronizing generator 29.

The form of signal derived from signal processor 26, representing the output of converter element 21 and in turn the image on copy board 12, can be utilized in several ways. First of all, it can be recorded on drum 1 through the OFT by placing switch 32 in the b position. Secondly, with switch portion b open, signals may be transmitted to an output terminal 37, or to buffer memory 36. From output terminal 37, the signals may pass to data transmitter 44 through band compressor 46 and modem 48. If the signals are stored in memory 36, they can either be transmitted later or brought back and applied to the drum 1 if switch 32 is in the c position.

As an additional feature of the present invention, by turning switch 32 to position d, the OFT may be supplied from buffer memory 35 through pattern generator 33. This buffer memory 35 may have stored therein signals either from data terminal 44 or computer 50, depending on the position of switch 34. When connected to terminal e data terminal is connected to buffer memory 35 through modem 48, while terminal f connects computer 50 to this buffer memory, an output from the computer energizing signal generator 29.

It will thus be appreciated from the foregoing description that I have provided a composite information recording apparatus of extreme versatility. By using a relatively simple switching connection and a compact mechanical arrangement, it is possible to take the image from a copy board and not only immediately produce copies thereof from a conventional light sensitive drum, but to convert this image into digital signals which can be transmitted, stored and/or reapplied to the drum for later use.

With substantially the same apparatus, it is possible to apply to the drum through the reproducing means such as the OFT not only the image from the copy board, but external signals such as facsimile, data or computer outputs.

While the present invention has been described as carried out in specific embodiments thereof, there is no desire to be limited thereby, but it is intended to cover the invention broadly within the spirit and scope of the appended claims.

What we claim is:

1. A composite information recording apparatus having an optical system for projecting an image of an original supported on a copy board onto a light sensitive medium, means for reproducing an electrical information signal as an electrostatic latent image on said medium, and means for producing a visible recording by developing either image on the light sensitive medium, the improvement comprising a second optical system, an optical switching mirror for transferring the image on said copy board to said second optical system, a photoelectric converter located at the imaging portion of said second optical system, external signal transmitting apparatus, and means switching the input of said signal reproducing means to the output of photoelectric converter or to the output of said external signal transmitting apparatus.

2. A composite information recording apparatus according to claim 1, in which said external signal transmitting apparatus includes a buffer memory.

3. A composite information recording apparatus according to claims 1 or 2 in combination with means processing the output of said photoelectric converter, said last means including a video amplifier, an analog-to-digital converter and an interface unit in the form of a signal processor, whereby the output of said photoelectric converter is suitable for facsimile transmission.

4. A composite information recording apparatus according to claim 1 in which the means for reproducing the electrical information signal is an optical fiber tube having horizontal and vertical deflecting circuits, and in which the light-sensitive medium is a rotatable drum, in combination with means synchronizing said circuits with the operations of the copy board and the said drum.

* * * * *